United States Patent [19]

Pietzsch

[11] Patent Number: 4,868,896
[45] Date of Patent: Sep. 19, 1989

[54] OPTICAL SUPERHETERODYNE RECEIVER FOR, IN PARTICULAR, PHASE-SHIFT MODULATED LIGHT

[75] Inventor: Joachim Pietzsch, Munich, Fed. Rep. of Germany

[73] Assignee: Siemens Aktiengesellschaft, Berlin and Munich, Fed. Rep. of Germany

[21] Appl. No.: 167,860
[22] PCT Filed: Jul. 17, 1987
[86] PCT No.: PCT/DE87/00322
  § 371 Date: Feb. 19, 1988
  § 102(e) Date: Feb. 19, 1988
[87] PCT Pub. No.: WO88/00778
  PCT Pub. Date: Jan. 28, 1988

[30] Foreign Application Priority Data

Jul. 21, 1986 [DE] Fed. Rep. of Germany ....... 3624601
Jul. 10, 1987 [DE] Fed. Rep. of Germany ....... 3722936

[51] Int. Cl.$^4$ ............................................. H04B 9/00
[52] U.S. Cl. .................................... 455/619; 455/610; 455/612
[58] Field of Search ............... 455/619, 612, 610, 609, 455/600, 617; 329/144; 350/96.15, 96.16

[56] References Cited

U.S. PATENT DOCUMENTS 4,718,121  1/1988  Epworth ............................ 455/617
4,732,447  3/1988  Wright et al. ..................... 455/619

OTHER PUBLICATIONS

Smith; "Techniques for Multigigabit Coherent Optical Transmission"; *Journal of Lightwave Technology;* vol. LT-5; No. 10; Oct. 1987; pp. 1466-1478.
Abbas et al.; "A Dual-Detector Optical Heterodyne Receiver for Local Oscillator Noise Suppression"; *Journal of Lightwave Technology;* vol. LT-3; No. 5; Oct. 1985; pp. 1110-1122.
Kazovsky; "Balanced Phase-Locked Loops for Optical Homodyne Receivers: Performance Analysis; Design Considerations; and Laser Linewidth Requirements"; *Journal of Lightwave Technology;* vol. LT-4; No. 2; Feb. 1986; pp. 182-195.
Dandridge et al.; "Fiber Optic Interferometric Sensor Development at NRL"; Naval Research Laboratory; Washington, D.C.; International Conference on Optical Fibre Sensors; Apr. 26-28, 1983; London, IEEE; pp. 48-52.
Davis et al.; "Coherent Optical Receiver for 680 Mbit/s Using Phase Diversity"; *Electronic Letters;* Jan. 1986; vol. 22; No. 1; pp. 9-11.
Hodgkinson et al.; "Demodulation of Optical DPSK Using In-Phase and Quadrature Detection"; *Electronic Letters;* Sep. 1985; vol. 21; No. 19; pp. 867-868.
Leeb, "Realization of 90°-and 180° Hybrids for Optical Frequencies", 37 AEV 203 (1983).
Priest, "Analysis of Fiber Interferometer Utilizing 3×3 Fiber Coupler", IEEE Journal of Quantum Electronics, vol. QE-18, No. 10 (10/82).
Stowe, "Passive Quadrature Demodulation for Interferometric Sensors", Optical Fibre Conference, New Orleans (1983).

*Primary Examiner*—Robert L. Griffin
*Assistant Examiner*—Andrew J. Telesz, Jr.
*Attorney, Agent, or Firm*—Hill, Van Santen, Steadman & Simpson

[57] ABSTRACT

Superheterodyne receivers for optical signals can be composed of two branches. The first branch contains a superheterodyne receiver in which the reception signal and the signal of a local oscillator are mixed in a traditional way; in the second receiver branch, the signal of the local oscillator experiences a 90° phase rotation before the mixing. An optical triple coupler inventively serves for dividing the reception light and the light of the local laser onto both reception branches. This triple coupler can be manufactured as a triple fiber coupler or, on the other hand, has an integrated-optical triple coupler of lithium niobate, glass or of a III-V semiconductor.

15 Claims, 2 Drawing Sheets

OPTICAL SUPERHETERODYNE RECEIVER FOR, IN PARTICULAR, PHASE-SHIFT MODULATED LIGHT

FIELD OF THE INVENTION

The present invention is directed to an optical superheterodyne receiver which is particularly adapted for the reception of phase shift modulated light.

DESCRIPTION OF THE PRIOR ART

Optical superheterodyne receivers are known from the Journal of Lightwave Technology, Vol. LT-3, No. 5, October, 1985, pages 1110 through 1122 and No. 6, December, 1985, pages 1238 through 1247 and from Electronics Letters, Sept. 12, 1985, Vol. 21, No. 19, pages 867 and 868. Upon utilization of a potentially modified "Costas loop", an optical superheterodyne receiver that is actually composed of two receiver branches is constructed in the second publication. The reception signal and local oscillator signal are mixed in a traditional way in the first receiver branch; in the second receiver branch, the local oscillator signal experiences a 90° phase rotation before the mixing. In this case, optical directional couplers are required that are referred to as optical hybrids; a directional coupler at whose two outputs the superimposed lightwaves of the signal and of the local laser appear is referred to as a 90° hybrid. One of the output signals of the 90° hybrid thereby contains a component having an additional 90° phase rotation. According to the first publication, the influence of the laser intensity noise can be eliminated by using a balance receiver. A phase-locked publication; however, a 90° hybrid is likewise utilized, its two output signals being separately demodulated after the conversion into photo currents and being subsequently summed. Differential phase shift keying (DPSK) is thereby used.

AEÜ, Vol. 37 (1983), No. 5/6, pages 203 through 206 discloses the realization of 90° and 180° hybrid branching for optical signals having wavelengths of about 10 $\mu$m. The known 90° and 180° hybrids are thereby realized with discrete optical elements, so that an extremely involved structure derives overall. A proposal for a 180° hybrid in integrated optics is also known from the publication cited above, the light path therein being construsted on a lithium niobate substrate.

Presentation TUB5 of D W. Stowe at the Optical Fiber Conference, New Orleans 1983, discloses that an optical 90° hybrid may be realized coupling by four 2×2 couplers; the demands made of the monitor of the optical path length between the couplers, however, are extremely high.

90° hybrids composed of a 3×3 fiber coupler having connected photodiodes are known from the work of R. G. Priest, IEEE Journal of Quantum Electronics, Vol. QE-18 (1982), pages 1601 through 1603, of K. P. Koo, A. B. Tveten and A. Dandridge in Appl. Phys. Lett. 41 (7), Oct. 1, 1982, pages 616–618 and of A. Dandridge et al in Intermat. Conference on Optical Fiber Sensors, London 1983, pages 48–52 relating to sensor technology and, in particular, to fiber interferometers. A symmetrical 3×3 coupler having a respective 120° phase shift between the outputs is used for the realization of the 90° hybrid The theoretical derivation of the principle by R. G. Priest is based on an ideal, loss-free coupler.

SUMMARY OF THE INVENTION

The object of the present invention is comprised in developing an optical receiver of the species initially cited that, given little outlay, is exployable in optical communications transmission with light waveguides and which eliminates the need for an intermediate frequency amplification.

This object is inventively achieved by an optical superheterodyne receiver of the species initially recited which utilizes a triple optical coupler. The outputs of the triple optical coupler are manipulated to provide a data signal and control signal. By virtue of such manipulation, the control signal is devoid of a D.C. component. The control signal may thus be used to more accurately control the local laser.

By contrast to the known 90° hybrids of symmetrical 3×3 fiber couplers, the inventiion also advantageously enables the employment of partly symmetrical 3×3 fiber couplers that enable an increase in the receiver sensitivity, particularly given homodyne reception. Consequently it thereby not absolutely mandatory that the employed coupler be loss-free and symmetrical.

As a result of the difference formation of the electrical signals generated from the optical signals, the constant components and the laser intensity noise are suppressed in an advantageous way since the constant components have the same operational sign but the useful transmitted in phase difference or phase modulation exhibit opposite operational signs.

For the purpose of suppressing the constant component that is disturbing in view of the regulation of the local laser, the optical superheterodyne receiver of the invention can be further developed in the way recited in patent claims 7, 8 and 9.

BRIEF DESCRIPTION OF THE DRAWINGS

The invention shall be set forth in greater detail below with reference to an optical homodyne receiver for PSK-modulated signals that is shown in the drawing as an exemplary embodiment.

Shown in the drawing are.

DESCRIPTION OF THE PREFERRED EMBODIMENTS

Figure 1:
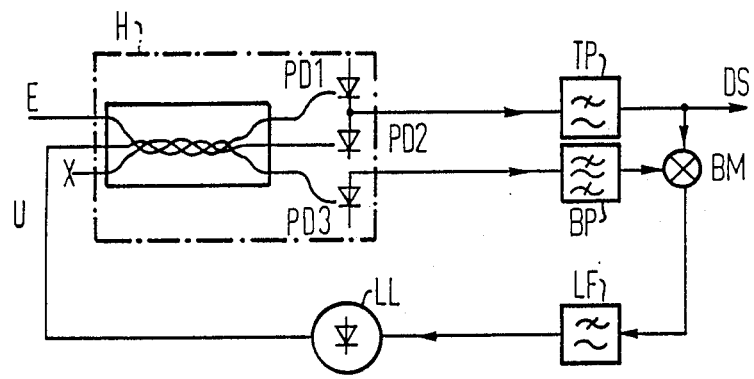
FIG. 1 is a schematic of a fundamental circuit of an optical homodyne receiver.

At its reception side, the optical homodyne receiver shown in FIG. 1 contains a 90° hybrid H whose one input E is connected to a source for the reception signal, i.e., for example, to a first light waveguide carrying optical communication signals, and whose other input U is connected to a local laser LL via a further light waveguide. The optical 90° hybrid is a commercially available triple fiber coupler having three symmetrical inputs and outputs. The first input of the fiber coupler is simultaneuously the input E for the useful signal and the second input is that for the light of the local laser; the third input remains unwired. The outputs of the fiber coupler, however, are each separately connected to a photoelectric transducer PD1, PD2, PD3. Such transducers may be commercially available photodiodes. As a result of the symmetrical fiber coupler, a uniform power division with respectively about 33% coupling derives; given at least approximately loss-free coupler the photocurrents generated by the three photodiodes PD1, PD2, PD3 are each phase-shifted by 120° relative to one another. Upon condition of a phase-shift modulated reception signal, the original data signal again derives from the difference between the photocurrents of the second and of the first photodiode given in-phase coupling of the local laser. This original data signal is available at an output terminal for the suppression of noise signals after passing through a low-pass TP. The data signal is orthogonal to the alternating part of the third photocurrent and thus allows the realization of a Costas loop. The photocurrent $I_3$ generated by the third photodiode traverses a band-pass BP for suppressing noise signals and the constant component and is supplied to a balance mixer BM. A further input terminal of this mixer is connected to the output terminal for the data signal DS; the product of the potentially amplified photocurrent of the third photodiode PD3 and the data signal DS is formed in the mixer. This phase-shifted signal is supplied via a loop filter LF to the control input of a local laser LL that is a matter of a one-mode and particularly narrow-banded laser diode as disclosed, for example, in Electronics Letters, 19, 1984, No. 3, pages 938 through 940.

In the separate illustration of the reception part of the optical receiver according to FIG. 2, E and U again reference the terminals of the triple fiber coupler FK for the received light and for the light generated by the laser. As in FIG. 1, the symmetrical outputs A1, A2, A3 are connected to allocated photodiodes PD1, PD2, PD3; the first and the second photodiode PD1, PD2 are thereby connected in series and are connected to a source for a first inhibit voltage $U_1$ via the anode of the first photodiode PD1 and are connected reference voltage via the cathode of the second diode PD 2. Correspondingly, the anode of the third photodiode is connected via a resistor R to a source for a second inhibit voltage $U_2$ the cathode of this third photodiode is connected to reference potential. The difference between the photocurrents $I_2$, $I_1$ of the two diodes is taken via a terminal between the first and the second photodiode PD1, PD2. After passing through the low-pass filter TP of FIG. 1, this difference serves as data signal DS and is also supplied to the balance mixer BM via an input terminal. The photocurrents $I_1$, $I_2$, $I_3$ derive from the light power $U_0^2$ of the local oscillator and from the light power $E_0^2$ of the reception light source given the assumption of a conversion factor K of light power to photocurrent for the photodiode used, whereby the field amplitudes at the input of the triple coupler are $$E = \sqrt{2} \times E_0 \times \cos(\omega t + \phi_1)$$

for the reception light and $$U = \sqrt{2} \times U_0 \times \cos(\omega t + \phi_2)$$

for the light of the local oscillator, whereby $\omega$ references the optical radian frequency $\alpha_1$, $\alpha_2$ reference the phase relation of the respective light.

The photocurrents $I_1$, $I_2$, $I_3$ as well as the difference between the photocurrents of the second and first photodiode then derive at $$I_1 = \frac{K}{3} \{E_0^2 + U_0^2 + 2 E_0 U_0 \cos(\phi_1 - \phi_2 + \phi)\}$$

$$I_2 = \frac{K}{3} \{E_0^2 + U_0^2 + 2 E_0 U_0 \cos(\phi_1 - \phi_2 + \phi)\}$$

$$I_3 = \frac{K}{3} \{E_0^2 + U_0^2 + 2 E_0 U_0 \cos(\phi_1 - \phi_2)\}$$

$$I_2 - I_1 = 4/3 \, K \times \sin\phi \, E_0 U_0 \sin(\phi_1 - \phi_2)$$

The phase rotation for the symmetrical triple coupler amounts to $\phi = 120°$. A disturbing constant component $E_0^R + U_0^2$ in the photocurrent $I_3$ is present in the simple solution of the input part of FIG. 2. This constant portion is not present in the $I_2 - I_1$ part because it is eliminated by the subtraction process.

Figure 2:
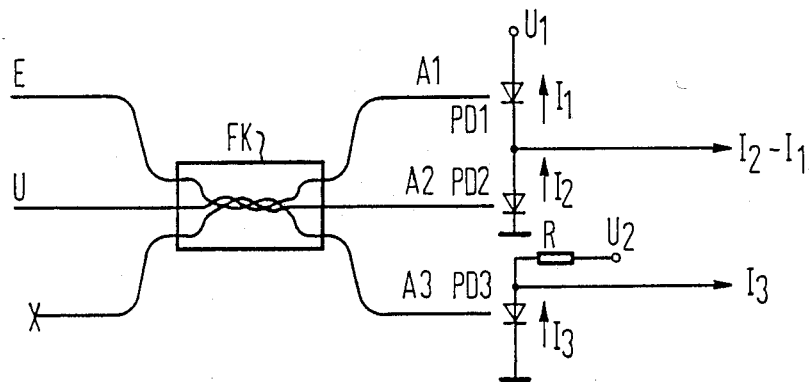
FIG. 2 is a detailed illustration of the input part of the homodyne receiver FIG. 1.
Figure 3:
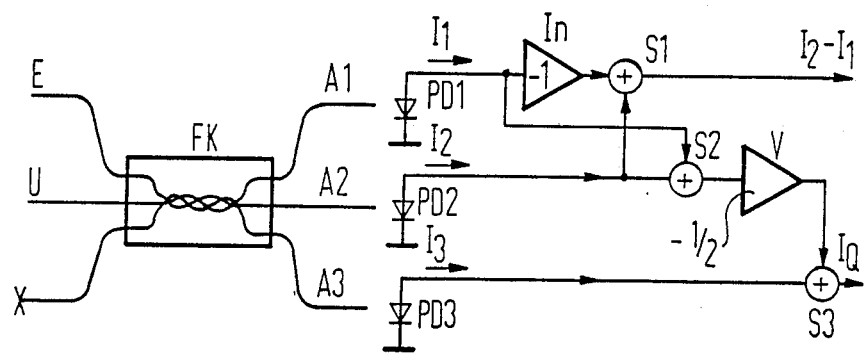
FIG. 3 is a schematic of the reception portion of a homodyne receiver showing an embodiment of the present invention.

FIG. 3 shows the fundamental circuit of a reception part of an optical homodyne receiver for phase-shift modulated signals wherein a dc-free quadrature signal $I_Q$ is formed instead of the photocurrent $I_3$ of the third photodiode. With respect to the wiring of its input and output terminals, the fiber coupler FK corresponds to that of FIG. 2; however, it is fashioned as a partly symmetrical coupler. Given such an approximately partly symmetrical triple fiber coupler, the outputs connected to the first and to the second photodiode are approximately uniformly coupled to its two inputs for the reception light and for the light of the local laser. In this case, too, the third input is not wired; the output of the triple fiber coupler connected to the third photodiode exhibits a different coupling in comparison to the two other outputs. In this case, the output of the first photo-electric detector PD1 is connected to the one input of a first summer S1 via an inverter In and is also directly coupled to an input of a second summer S2. Correspondingly, the output of the second photo-electric detector PD2 is directly ted to the second inputs of the first and of the second summer S1, S2. The difference signal $I_2 - I_1$ is again available at the output of the first summer S2. The output of the second summer S2 is connected to the one input of a third summer S3 via an amplifier V. The other input of this third summer S3 is connected to the output of the third photoelectric transducer PD3. The amplifier V is fashioned as an inverting amplifier having a gain factor corresponding to the ratio of coupling factor for the output A3 to the sum of the coupling factors for the outputs A1 and A2. The quadrature current $I_Q$ that is phase-shifted by 90° relative to the difference current $I_2 - I_1$ is output at the output of the third summer S3. After multiplication in the balance mixer BM of FIG. 1, a setting signal for the local laser LL that is freed of the data modulation also derives with the dc-free quadrature current of FIG. 3. The freedom from dc arises in that the constant components of the three photocurrents $I_1$, $I_2$, $I_3$ have the same operational sign, whereas the phase-shift signals are phase-shifted dependent on the coupling factors of the fiber coupler.

Figure 4:
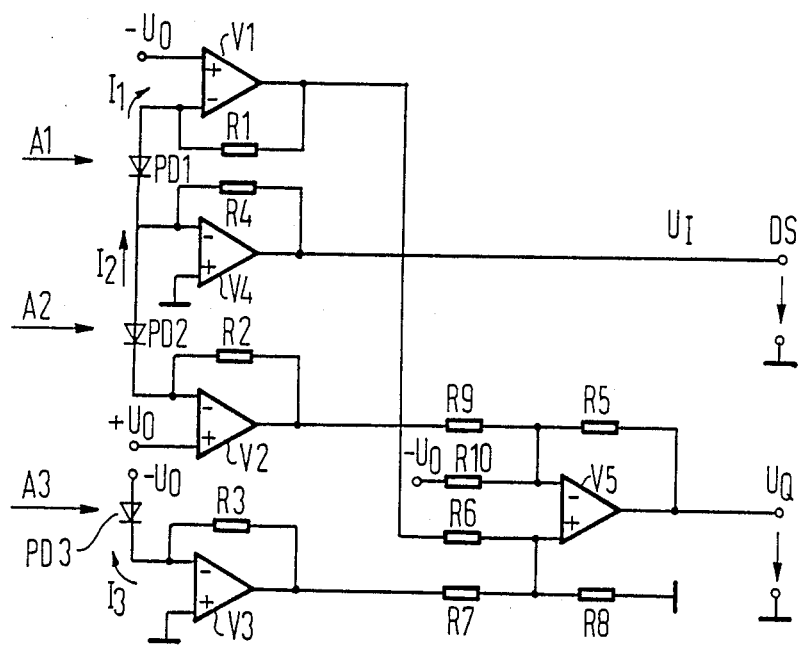
FIG. 4 is a schematic diagram of the electronic circuit of the receiver part shown in FIG. 3.

FIG. 4 shows the electronic circuit part of the reception part of FIG. 3 in greater detail. The circuit contains the photocurrent amplifiers realized with operational amplifiers. The first through fourth amplifiers V1, V2, V3, V4 are thereby fashioned as transimpedance amplifiers and the fifth amplifier V5 is fashioned as a summing amplifier. PIN photodiodes were used as photoelectric transducers.

The first PIN photodiode PD1 whose anode terminal is connected to the inverting input of the first operational amplifier V1 is optically coupled to the first output terminal A1 of the fiber coupler FK. The non-inverting input of this operational amplifier is connected to a source for a first inhibit voltage $-U_o$; further, from its output, this operational amplifier is negatively fed back to the inverting input via a first resistor R1. The cathode terminal of the first PIN photodiode PD1 is connected to the anode terminal of the second PIN photodiode PD2 that is optically coupled to the second output A2 of the fiber coupler FK. The cathode terminal of the second PIN diode PD2 is connected to the inverting input of a second operational amplifier V2 whose non-inverting input is connected to a source for a second inhibit voltage $+U_0$ and whose output is connected via a second resistor to the inverting input of the second operational amplifier. A third PIN diode PD3 is optically connected to the third outputs of the fiber coupler FK, the anode terminal of this third PIN diode being connected to a source for the negative inhibit voltage $-U_0$ and the cathode terminal thereof being connected to the inverting input of a third operational amplifier V3. The non-inverting input of this operational amplifier V3 is connected to reference potential; the output and the inverting input of this amplifier are connected to one another via a third register R3. The PIN photodiodes PD1, PD2 are connected to one another in anti-parallel fashion, so that a difference current that s picked up from the inverting input of a fourth operational amplifier V4 flows at the junction of the cathode of the first PIN diode PD1 and the anode of the second PIN photodiode PD2. The non-inverting input of this amplifier is connected to reference potential; a feedback from the output of this amplifier onto its inverting input ensues via a fourth resistor R4.

The gain of the operational amplifiers can be individually set via the feedback or, respectively, countercoupling resistors R1 ... R4 and asymmetries of the fiber coupler FK in view of power division of phase rotation and asymmetries of the characteristics or, respectively, of the efficiencies of the photodiodes can thereby be compensated. The fourth operational amplifier V4 generates a difference voltage $U_f$ from the difference current $I_2-I_1$ of second and of the first PIN photodiode PD2, PD1, this difference voltage $U_f$ pending at a data output for further processing as data signal DS. The exemplary embodiment proceeds on the basis of an approximately loss-free, partly symmetrical triple fiber coupler having a power division $T_1=T_2$ of, for example, 45% for the outputs A1 and A2 and T3 of, for example, 10% for the output A3. The resistors R1 and R2 then have the same value; the resistor R3 has the value of the resistor R1 multiplied by the division ratio $$\frac{T1 + T2}{2\,T3}$$

The output signals of three PIN diodes PD1, PD2, PD3 are to be linked with one another for generating an adjustment signal for the local laser. This purpose is served by a fifth operational amplifier V5 that likewise comprises a feedback from its output to its inverting input via a fifth resistor R5. The output of the first operational amplifier is connected via a sixth resistor R6 to the non-inverting input of the fifth operational amplifier V5; this non-inverting input is also connected via a seventh resistor R7 to the output terminal of the third operational amplifier V3 is also connected to reference potential via an eighth resistor R8. Further, the output terminal of the second operational amplifier V2 is connected to the inverting input of the fifth operational amplifier V5 via a ninth resistor R9. This input is connected via a tenth resistor R10 to a source for the negative inhibit voltage $-U_0$. The quadrature signal $U_Q$ from which the adjustment signal for the local laser is generated by multipliction with the data signal DS can be taken at the output of the fifth operational amplifier V5.

The sixth or, respectively, the seventh resistor R6, R7 together with the eighth resistor R8 as well as the ninth or, respectively, the tenth resistor R9, R10 together with the resistor R5 each form a voltage divider. The portion of the output voltages of the first through third amplifiers V1, V2, V3 to the input voltage of the fifth amplifier V5 is set with these voltage dividers. Due to the selected value for the third resistor R3 in the exemplary embodiment, the ninth resistor R9 exhibits the same and the ten resistor R10 exhibit twice the value of resistance of the resistor R5; correspondingly, the sixth resistor R6 exhibits the same and the seventh resistor R7 exhibit twice the value of resistance of the eighth resistor R8.

A transimpedance amplifier derives on the basis of the combination of operational amplifier with a resistor as, for example, in the case of the fourth amplifier V4 with the fourth resistor R4. For high frequencies, such an amplifier can be realized either with discrete transistors or as an integrated circuit. High-impedance amplifiers can also be utilized instead of transimpedance amplifiers. The summer V5 comprising the resistors R5 through R10 is difficult to realize at high frequencies can be omitted when the first amplifier V1 comprising the first resistor R1 and the amplifier V2 comprising the second resistor R2 are replaced by a first current mirror and by a second current mirror. The anode of the photodiode PD1 is thereby connected to the inpact of the first current mirror that supplies the output current $I_1{}^i=I_1$. In common with the cathode of the second photodiode PD2, the output of the first current mirror lies at the input of the second current mirror exhibits a proportional control factor equal to the gain factor of the amplifier V in FIG. 3. The output of the second current mirror is connected to the cathode of the third photodiode PD3 and, thus, is also connected to the inverting input of the third amplifier V3. The output signal of the third amplifier V3 is then already free of dc.

The employment of a partly symmetrical triple fiber coupler in the arrangements of FIGS. 1 through 3 and in combination with the arrangement of FIG. 4 produces a gain in the signal-to-noise ratio of the data signal given reduced coupling of the third output with the reference to the symmetrical triple fiber coupler. The phase rotation $\phi$ due to the triple fiber coupler deviates from 120°; in homodyne reception, a phase rotation $\phi$ of less than 120° advantageous since the amplitude of the data signal DS is thus increased, as derives from the relationships for $I_1$ and $I_2$ recited above.

Given employment of a partially symmetrical coupler in a DPSK quadrature receiver there is the possibility of selecting the same signal-to-noise ratio in both channels and, thus, of maximizing the receiver sensitivity by adapting the coupling ratios of the fiber couplers to the individual input noise of the input amplifier stages.

PIN photodiodes have been used as photo-electric detectors in the exemplary embodiment. Alternatively, avalanche multiplication photodiodes can also be utilized, their multiplication factor or internal gain being capable of being set by the applied, external voltage. An especially simple regulation of the photocurrent is thus possible.

An optical triple coupler is also possible in an integrated-optical execution. The waveguides are thereby buried so close next to one another in suittable material of a III-V semiconductor, lithium niobate, or glass that a coupling ensues between them. Subsequently, a third waveguide is produced in the middle above the two other waveguides, being produced on the surface of the integrated-optical module or as a buried structure in the material as well. The distance to the two other waveguides is likewise so slight that cross-coupling occurs. Integration with other components, for example polarization rotators, optical filters, photodiodes or laser diodes on a substrate is particularly advantageous.

Although modifications and changes may be suggested by those skilled in the art, it is the intention of the inventor to embody within the patent warranted hereon any changes and modifications as reasonably and properly come within the scope of this contribution to the art.

I claim:

1. An optical superheterodyne receiver for the reception of modulated light from a reception light source, said modulated light having a center frequency, said receiver comprising:
   a local laser having a control input and a light output, said light output having a frequency approximately coinciding with the center frequency of said modulated light, said light output responsive to said control input;
   a 90° hybrid which is an optical triple coupler having first, second and third inputs, said first input receiving light from said reception light source, said second input receiving said light output from said local laser, said third input remaining free from any input signal, said optical triple coupler also having a first, second and third outputs;
   detector means receiving light output from said first, second and third outputs of said optical triple coupler, for generating a first signal from the light output of said first output of said optical triple coupler, a second signal from the light output of said second output of said optical triple coupler, and a third signal from the light output of said third output of said optical triple coupler;
   subtractor means for subtracting said second signal from said first signal to form a data signal at an output of said subtractor means;
   quadrature means for producing a quadrature signal from said first, second and third signals, said quadrature signal having an a.c. component which is approximately orthogonal to said data signal; and
   mixer means for mixing said data signal and said quadrature signal to generate a control signal, said control signal supplied to said control input of said local laser.

2. An optical superheterodyne receiver as recited in claim 1, wherein said subtractor means comprises:
   an inverter having an input accepting said first signal from said detector means and having an output;
   an adder having a first input accepting said output of said inverter, a second input accepting said second signal from said detector means, and an output signal formed as the sum of said first and second input of said adder.

3. An optical superheterodyne receiver as recited in claim 2, wherein said quadrature means comprises:
   a first adder having a first input accepting said first signal from said detector means, a second input accepting said second signal from said detector means, and an output formed as the sum of said first and second inputs of said first adder;
   an inverting amplifier having an input accepting said output of said first adder and an output generated by multiplying said input of said inverting amplifier by a gain;
   a second adder having a first input accepting said output of said inverting amplifier, a second input accepting said third signal from said detector means, and an output formed as the sum of said first and second inputs of said second adder.

4. An optical superheterodyne receiver as recited in claim 3, wherein said inverting amplifier has gain corresponding to a coupling factor ratio, said coupling factor ratio corresponding to the ratio between the light power output at said third output of said triple optical coupler and the sum of the light power outputs at said first and second outputs of said triple optical coupler.

5. An optical superheterodyne receiver as recited in claim 1, wherein said optical triple coupler has an asymmetrical power distribution at the outputs thereof.

6. An optical superheterodyne receiver as recited in claim 5, wherein said quadrature means comprises:
   a first adder having a first input accepting said first signal from said detector means, a second input accepting said second signal from said detector means, and an output formed as the sum of said first and second inputs of said first adder;
   an inverting amplifier having an input accepting said output of said first adder and an output generated by multiplying said input of said inverting amplifier by a gain;
   a second adder having a first input accepting said output of said inverting amplifier, a second input accepting said third signal from said detector means, and an output formed as the sum of said first and second inputs of said second adder.

7. An optical superheterodyne receiver as recited in claim 6, wherein said inverting amplifier has a gain constant corresponding to a coupling factor ratio, said coupling factor ratio corresponding to the ratio between the light power output at said third output of said triple optical coupler and the sum of the light power outputs at said first and second outputs of said triple optical coupler.

8. An optical superheterodyne receiver as recited in claim 1, wherein said detector means comprises:
   a first photodetector detecting the light output from said first output of said triple optical coupler and generating therefrom a first current as said first signal;
   a second photodetector detecting the light output from said second output of said triple optical coupler and generating therefrom a second current as said second signal; and,
   a third photodetector detecting the light output from said third output of said triple optical coupler and generating therefrom a third current as said third signal.

9. An optical superheterodyne receiver as recited in claim 8, wherein said first, second and third photodetectors are PIN diodes.

10. An optical superheterodyne receiver as recited in claim 1, wherein said detector means, said quadrature means and said subtractor means comprise in combination:

first, second and third photodetectors each having an anode and a cathode, said first photodetector detecting the light output from said first output of said triple optical coupler, said second photodetector detecting the light output from said second output of said triple optical coupler, said third photodetector detecting the light output from said third output of said triple optical coupler, said anode of said third photodetector connected to an inhibit voltage;

a first operational amplifier having a non-inverting input connected to said inhibit voltage, an inverting input connected to said anode of said first photodetector, and an output;

a first resistor connected between said output of said first operational amplifier and said inverting input of said first operational amplifier;

a second operational amplifier having a non-inverting input connected to common ground, an inverting input connected to said cathode of said first photodetector and said anode of said second photodetector, and an output forming said data signal;

a second resistor connected between said output of said second operational amplifier and said inverting input of said second operational amplifier;

a third operational amplifier having a non-inverting input connected to a further inhibit voltage, an inverting input connected to said cathode of said second photodetector, and an output;

a third resistor connected between said output of said third operational amplifier and said inverting input of said third operational amplifier;

a fourth operational amplifier having a non-inverting input connected to common ground, an inverting input connected to said cathode of said third photodetector, and an output;

a fourth resistor connected between said output of said fourth operational amplifier and said inverting input of said fourth operational amplifier;

a fifth operational amplifier having inverting and non-inverting inputs and an output;

a fifth resistor connected between said output of said third operational amplifier and said non-inverting input of said fifth operational amplifier;

a sixth resistor connected between said output of said fifth operational amplifier and said inverting input of said fifth operational amplifier;

a seventh resistor connected between said inhibit voltage and said inverting input of said fifth operational amplifier;

an eighth resistor connected between said output of said first operational amplifier and said non-inverting input of said fifth operational amplifier;

a ninth resistor connected between said output of said fourth operational amplifier and said non-inverting input of said fifth operational amplifier; and a tenth resistor connected between said non-inverting input of said fifth operational amplifier and common ground.

11. An optical superheterodyne receiver as recited in claim 10, wherein said first, second, third, and fourth resistors and said inhibit voltage are dimensioned to compensate for any asymmetries existing between said first, second and third photodetectors.

12. An optical superheterodyne receiver as recited in claim 1, wherein said reception light source supplies said modulated light as a DPSK optical signal.

13. A optical superheterodyne receiver as recited in claim 1, wherein said optical triple coupler is a triple fiber coupler.

14. An optical superheterodyne receiver as recited in claim 1, wherein said optical triple coupler has an asymmetrical power distribution at the outputs thereof.

15. An optical superheterodyne receiver as recited in claim 1, wherein said optical triple coupler is an integrated optical triple coupler formed from a material selected from the group consisting of glass, lithium niobate, or a III-V semiconductor.

* * * * *